United States Patent
Nakajima

(10) Patent No.: US 7,536,534 B2
(45) Date of Patent: May 19, 2009

(54) PROCESSOR CAPABLE OF BEING SWITCHED AMONG A PLURALITY OF OPERATING MODES, AND METHOD OF DESIGNING SAID PROCESSOR

(75) Inventor: Hiroyuki Nakajima, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 390 days.

(21) Appl. No.: 10/785,671

(22) Filed: Feb. 24, 2004

(65) Prior Publication Data

US 2004/0172519 A1 Sep. 2, 2004

(30) Foreign Application Priority Data

Feb. 27, 2003 (JP) ............................. 2003-051201

(51) Int. Cl.
G06F 9/30 (2006.01)
G06F 9/40 (2006.01)
G06F 15/00 (2006.01)

(52) U.S. Cl. ..................................... 712/209
(58) Field of Classification Search .................. 712/209
See application file for complete search history.

(56) References Cited

U.S. PATENT DOCUMENTS

| | | | | |
|---|---|---|---|---|
| 5,774,686 A | * | 6/1998 | Hammond et al. | 712/209 |
| 5,784,602 A | * | 7/1998 | Glass et al. | 712/220 |
| 6,081,884 A | * | 6/2000 | Miller | 712/204 |
| 6,167,529 A | * | 12/2000 | Dalvi | 713/501 |
| 6,430,674 B1 | * | 8/2002 | Trivedi et al. | 712/43 |
| 6,725,354 B1 | * | 4/2004 | Kahle et al. | 712/34 |

FOREIGN PATENT DOCUMENTS

| | | |
|---|---|---|
| JP | S62-123552 | 6/1987 |
| JP | H1-147722 | 6/1989 |
| JP | H3-34025 | 2/1991 |
| JP | 8-106383 | 4/1996 |
| JP | 9-212358 | 8/1997 |
| JP | 9-282159 | 10/1997 |
| JP | H9-330219 | 12/1997 |
| JP | H11-15658 | 1/1999 |
| JP | 2000-137619 | 5/2000 |
| JP | 2002-230065 | 8/2002 |
| JP | 2002-328804 | 11/2002 |
| JP | 2003-208306 | 7/2003 |

* cited by examiner

*Primary Examiner*—Eddie P Chan
*Assistant Examiner*—Brian P Johnson
(74) *Attorney, Agent, or Firm*—Scully, Scott, Murphy & Presser PC

(57) ABSTRACT

A processor has an instruction set A and an instruction set B. A system instruction decoder decodes a system instruction that specifies the operating mode of the processor, the system instruction not being included in either the instruction set A or the instruction set B. A system instruction execution controller receives a decoded signal from the system instruction decoder, which has decoded an instruction requiring changeover of the instruction set, and sets the value of a instruction mode register. On the basis of the value in the instruction mode register, an instruction set changeover unit selects the instruction set to be used.

18 Claims, 12 Drawing Sheets

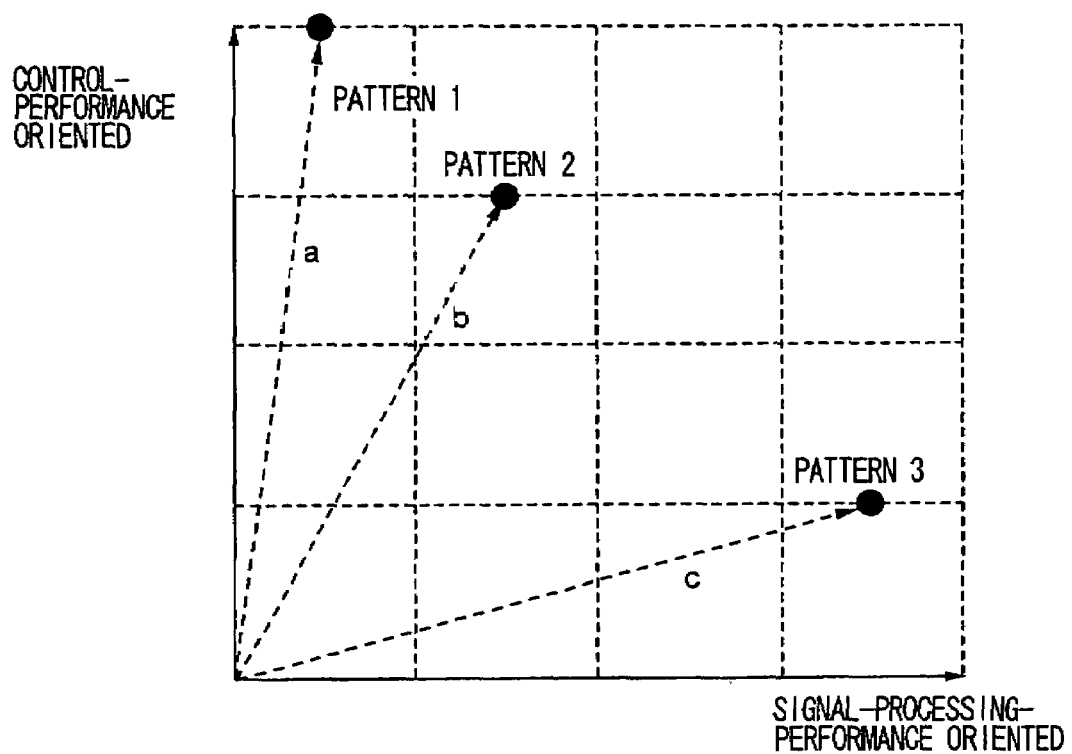

PROCESSOR CAPABLE OF BEING SWITCHED AMONG A PLURALITY OF OPERATING MODES, AND METHOD OF DESIGNING SAID PROCESSOR

FIELD OF THE INVENTION

The present invention relates to a processor, a system LSI circuit, a method of designing the system LSI circuit and a recording medium on which the computer program for realizing this method has been recorded. More specifically, the invention relates to a processor capable of being switched among a plurality of operating modes, a system LSI circuit having such a processor, a method of designing this system LSI circuit, and a recording medium on which the computer program for realizing this method of design has been recorded.

BACKGROUND OF THE INVENTION

System LSI circuits, that are used in a wide variety of processing such as image processing, encryption processing, filter processing and decoding processing and the like, involve various types of input/output signals, various processing algorithms or a variety of required time-related capabilities. A system LSI circuit incorporates a processor that has a single instruction set composed of performance-oriented instructions suited to the processing required. In this case, if the content of processing executed by the system LSI circuit includes, e.g., both processing suited to an instruction set oriented toward controll performance and an instruction set oriented toward signal processing performance, overall processing cannot be executed at high speed with just a single processor.

A processor adapted for being switched between a reduced instruction set and a high-performance instruction set in response to a speed changeover instruction is described in the specification of Japanese Patent Kokai Publication JP-A-8-106383 (termed as Patent Reference 1) as means capable of selecting among an optimum program, processing and processing speed in accordance with the nature of processing to be executed. FIG. 12 illustrates the structure of the processor described in the Patent Reference 1. Here a high-speed program written in RISC instructions (a reduced instruction set) and a low-speed program written in CISC instructions (a complex instruction set) have been stored in a main memory 201 in shared fashion as an application program having a speed changeover instruction as a boundary between them. An R/C register 209 stores a low-speed mode or a high-speed mode in an R/C flag.

When the R/C flag stored in the R/C register 209 is indicative of the high-speed mode, a decoder selection circuit 206 supplies a RISC decoder 207 with the high-speed program (RISC instructions) that have been fetched from the main memory 201 and stored in an instruction register 205. If the speed changeover instruction (low-speed changeover instruction), which is a RISC instruction, is now executed upon being decoded by the RISC decoder 207, the low-speed mode is set in the R/C flag. When this is done, a clock selection circuit 218 changes over the selected state to change an execution clock ϕ' from a master clock ϕ to a frequency-divided clock obtained by frequency-dividing the master clock ϕ by n in an n frequency divider 219. Further, the decoder selection circuit 206 changes over the selection state and supplies a CISC decoder 211 with the low-speed program (CISC instruction), which has been fetched from the main memory 201 and stored in the instruction register 205, via a mapping unit 208 and address selector 210.

If the speed changeover instruction (high-speed changeover instruction), which is a CISC instruction, is executed upon being decoded by a CISC decoder 211, the high-speed mode is set in the R/C flag. When this is done, the clock selection circuit 218 changes over the selected state to change the execution clock ϕ' to the master clock ϕ from the frequency divided clock obtained on frequency division by n by the n frequency divider 219. Further, the decoder selection circuit 206 changes over the selected state and supplies the RISC decoder 207 with the RISC instruction that has been fetched from the main memory 201 and stored in the instruction register 205. Thus, the processor 200 switches between the high-speed instruction set and the low-speed instruction set dynamically in response to the speed changeover instruction inserted at the boundary between the low- and high-speed programs.

Art having a plurality of instruction sets from among which any instruction set is selected for use by employing a predetermined bit, which usually is not used, of a program counter (PC) register is described in the specification of Japanese Patent Kokai Publication No. JP-P2002-328804A (Patent Reference 2) as other means whereby an instruction set to be used is changed over dynamically in response to a changeover instruction included in an application program. This technique differs from that of Patent Reference 1 in that it does not require the dedicated R/C register 209 (see FIG. 12) for changing over the instruction set.

[Patent Reference 1]
Japanese Patent Kokai Publication JP-A-8-106383

[Patent Reference 2]
Japanese Patent Kokai Publication JP-P2002-328804A

SUMMARY OF THE DISCLOSURE

With the techniques disclosed in the above described Patent References 1 and 2, the instruction for changing over the instruction set used is executed upon being decoded by the decoder of each instruction set. In a processor that includes, e.g., two or more instruction sets, there must be provided such circuit resources for making the decoder of each instruction set decode the instruction for the changeover to another instruction set, thereby to enlarge the circuitry size. Further, when an instruction set is changed over, it is required that the changeover instruction corresponding to the currently selected instruction set be inserted between the programs of different instruction sets. Here the problem is that it is necessary to recognize the instruction set that prevailed prior to the changeover in addition to the instruction set after the changeover.

Accordingly, it is an object of the present invention to provide a processor in which even if there is an increase in the number of instruction sets to be switched among, there is no increase in the size of decoder circuitry for decoding an instruction-set changeover instruction, and in which insertion of the changeover instruction can be performed with ease because it is unnecessary to recognize an instruction set that prevailed prior to changeover.

Another object of the present invention is to provide a system LSI circuit that includes one or more of the above-mentioned processors, a method of designing this system LSI circuit, and a recording medium on which this method has been recorded.

The above and other objects are attained by a processor, in accordance with one aspect of the present invention, having a plurality of processor functions for executing each of a plurality of instruction sets, which comprises a system instruction decoder, which is provided separately of the plurality of processor functions, for decoding a system instruction that is not executed by any of the plurality of processor functions, and a system instruction execution unit for selecting one of the plurality of processor functions in response to the system instruction that has been decoded by the system instruction decoder.

With the processor according to the present invention, a prescribed system instruction is included in an application program and specifies the instruction set to be used. When the prescribed system instruction is decoded by a system instruction decoder and execution control is performed by the system instruction execution unit, the processor executes the read-in instruction using the processor function that corresponds to the instruction set used. The system instruction that specifies the instruction set used is executed using the system decoder and system instruction execution unit that are exclusively for the system instruction. Even if the instruction used is changed over, therefore, it is unnecessary to recognize the instruction set currently being used and changeover of the instruction set to be used can be performed with facility. Further, in a case where instruction sets having different processing performance orientations are included in the processor, the processing speed of overall processing can be raised by dynamically changing over to a performance-oriented instruction set suited to the particular processing in accordance with the processing to be executed by the processor.

Preferably, the processor according to the present invention is such that the system instruction execution unit selects one of the plurality of processor functions in response to a prescribed interrupt signal. In this case, an instruction that has been read in can be executed, using the processor function that corresponds to the specified instruction set, even in response to a prescribed interrupt signal that specifies the instruction set used.

Preferably, the processor according to the present invention is such that at least two of the plurality of processor functions share hardware resources.

If the plurality of functions are implemented by respective ones of independent hardware components, hardware resources such as adders and multipliers cannot be shared. However, by including a plurality of processor functions (instruction sets) in one processor, it becomes possible to share general-purpose hardware resources and the hardware resources can be exploited more effectively in comparison with a case where the processor functions are implemented by individual hardware components.

The processor according to the present invention is such that at least two of the plurality of instruction sets include a common instruction and a plurality of processor functions corresponding to these at least two instruction sets share an instruction set decoder for decoding the common instruction. In such case the common instruction is executed upon being decoded by the common decoder. Wasting of circuit resources can be eliminated as compared with the case where the decoding and execution of a common instruction are implemented by each individual processor function.

Preferably, the processor according to the present invention is such that the system instruction includes at least one instruction that sets power-supply voltage and operating speed at which the processor operates. A system instruction that specifies the operating mode of the processor can include not only an instruction that specifies the instruction set used but also an instruction that sets the operating power-supply voltage or operating speed (clock frequency used) of the processor.

The processor according to the present invention further includes a storage unit for storing processing control data corresponding to each instruction included in the plurality of instruction sets. On the basis of an entered instruction and information concerning a selected processor function, an address that corresponds to the entered instruction is generated and processing control data corresponding to the entered instruction is read out of the storage unit. In this case the storage unit stores, e.g., a horizontal microcode (a horizontal instruction), which is to be output by a decoder or execution controller in an ordinary processor, as the processing control data. On the basis of an entered instruction (instruction code) and information concerning a selected instruction set, the processor reads the processing control data out of the storage unit and executes the instruction. For example, even if the memory capacity of the storage unit is fixed, the number of instructions and number of instruction sets included in the processor can be increased by adopting an arrangement in which the processing control data stored by the storage unit is changed programmably.

The processor according to the present invention is such that at least two processor functions among the plurality thereof can be configured as a common instruction set. In this case the processor includes a plurality of processor functions for which modes of use of hardware resources differ, although the instruction sets per se are the same.

In general, hardware resources supporting high-speed operation involve circuitry of larger size than is the case with hardware resources for low-speed operation. As a consequence, even if a processor function corresponding to high-speed operation is implemented at low speed in order to suppress power-dissipation, the arrangement is such that hardware resources are redundant with regard to low-speed operation and, hence, power is consumed needlessly. For example, including a high-speed instruction set and a low-speed instruction as common instruction sets and using processor functions corresponding to respective ones of the high- and low-speed instruction sets by switching between these processor functions, processors that execute the same command can be operated with the minimum necessary resources so that a further reduction in power-dissipation becomes possible.

Preferably, the processor according to the present invention is such that at least one of the plurality of processor functions is subjected to pipeline control in which the number of stages is set variably, and the number of stages in this pipeline control is set in response to a specific system instruction. In this case the system instruction includes an instruction that specifies the number of pipeline stages, and the processor is such that the number of pipeline stages of the processor function is set at will by execution of the system instruction that specifies the number of pipeline stages.

The processor of pipeline control according to the present invention is such that the number of stages in pipeline control can be varied, with the number of stages being set in response to a stage-number setting instruction that has been input to the processor.

The processor of pipeline control according to the present invention is such that the number of pipeline stages of the processor can be changed by executing the stage-number setting instruction, which is included in the program, for setting the number of pipeline stages. This processor is such that the number of pipeline stages can be changed over dynamically during program execution. In the case of processing that requires higher speed, therefore, the speed of processing can be raised by increasing the number of pipeline stages.

A system LSI circuit according to the present invention is characterized by having the processor of this invention.

A system LSI circuit according to another aspect of the present invention is characterized by having a plurality of the processors of this invention, each processor having a plurality of processor functions.

The system LSI circuit in accordance with another aspect of the present invention is such that hardware resources can be shared among a plurality of instruction sets included in each processor, and therefore hardware resources can be exploited more effectively in comparison with a case where the system LSI circuit has independent processors separately for every instruction set. Further, since the instruction set used can be changed over dynamically processor by processor, the processing performance of the system LSI circuit can be improved by selecting an instruction set in accordance with the processing required by the system LSI circuit.

Preferably, the system LSI circuit of the present invention is such that the plurality of processors operate based upon either a first pattern in which all processors operate according to the same instruction set, or a second pattern in which at least one processor operates according to an instruction set that is different from those of the other processors.

By way of example, when a single process is executed, the system LSI circuit is operated based upon the first pattern, i.e., all processors are operated according to the same instruction set and the processors are made to operate in parallel, thereby making it possible to raise processing speed. Further, when complex processing, in which processing for the control system and processing for the signal processing system are executed in parallel, is carried out, the system LSI circuit is operated based upon the second pattern, i.e., rather than operating all processors according to the same instruction set, a certain processor is operated according to an instruction set suited to the processing for the control system and the other processors are operated according to an instruction set suited to processing for the signal processing system, thereby making it possible to raise processing speed.

A method of designing a system LSI circuit according to the present invention is for designing a system LSI circuit having a plurality of processors each having a plurality of processor functions, the method comprising the steps of: dividing system LSI circuit design specifications into hardware design and software design at a function designing stage; entering, as hardware information in hardware design, hardware configurations corresponding to respective ones of the plurality of processors, and the system instruction and the plurality of instruction sets described at an algorithm level; and performing behavioral synthesis using the hardware information.

The method of designing the system LSI circuit according to the present invention is such that a system LSI circuit arrangement is obtained by behavior-synthesizing using hardware information that includes a plurality of instruction sets and a system instruction to be incorporated in a processor. As a result, a system LSI circuit including processors that share hardware resources such as arithmetic resources can be obtained. This makes it possible to obtain a system LSI circuit having a high processing performance with greater efficiency in hardware circuitry of limited size.

Preferably, the method of designing a system LSI circuit according to the present invention is such that an HDL description for logic synthesis suited to achieving hardware implementation, a simulation description suited for use in a simulation, and synthesis information indicating size of the hardware are generated at the behavioral synthesis step.

Preferably, the method of designing a system LSI circuit according to the present invention is such that the behavioral synthesis step is followed by a step of verifying operation of a designed system LSI circuit based upon the simulation description and a machine language instruction of software that operates the plurality of processors.

At the time of operation verification in which software is packaged in the circuitry of a system LSI circuit and verification of processing performance of the system LSI circuit and verification of design error is carried out at the clock-cycle level by a simulation technique such as an instruction set simulator, use is made of the simulation description obtained by behavioral synthesis, thereby making it unnecessary to model the system LSI circuit arrangement by human labor. This allows the verifying operation to be simplified. Further, by obtaining the simulation description by behavioral synthesis, re-performing the verifying operation is easy even in a case where a change has occurred in the system LSI circuitry.

Preferably, the method of designing the system LSI circuit according to the present invention is such that it is determined whether to return to the dividing step based upon the synthesis information and the result of verification performed at the operation verifying step.

The size of the system LSI circuitry is estimated based upon the synthesis information obtained by behavioral synthesis, and when it is determined that the size of the circuitry exceeds the size of circuitry required by the system LSI circuit, the design of the system LSI circuit can be performed again from the division into the hardware design and software design. Further, in a case where it is found from the operation verification that operation is not normal or that the time-related performance required by the system LSI circuit is not met, the design of the system LSI circuit can be performed again from the division into the hardware design and software design.

Preferably, the method of designing the system LSI circuit according to the present invention includes steps of creating a source program, which includes instructions of the plurality of instruction sets and a system instruction, for each of the plurality of processors at design of the software, and translating the source programs of respective ones of the processors into machine language collectively by referring to the hardware information.

When one processor has a plurality of instruction sets, instructions corresponding to the plurality of instruction sets are mixed in the source program for this processor. Such source programs are translated collectively into machine language, which the processor can comprehend directly, using a multi-target assembler-compiler linker corresponding to the plurality of instruction sets and system instruction that are included in the processor. By referring at this time to hardware information that has been input to the multi-target assembler-compiler linker at the processor design stage, the machine language is generated upon identifying in which instruction set an instruction in the source program is included. It should be noted that the collective translation to machine language means generating the source codes as single program code.

A recording medium according to the present invention is characterized in that a program for implementing the above-described method of designing the system LSI circuit of the present invention is recorded on the storage medium.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 6 is a vector diagram illustrating the processing performance of each operating pattern of the system LSI circuit shown in FIGS. 5a, 5b and 5c;

PREFERRED EMBODIMENTS OF THE INVENTION

Preferred embodiments of the present invention will now be described in detail with reference to the drawings.

Figure 1:
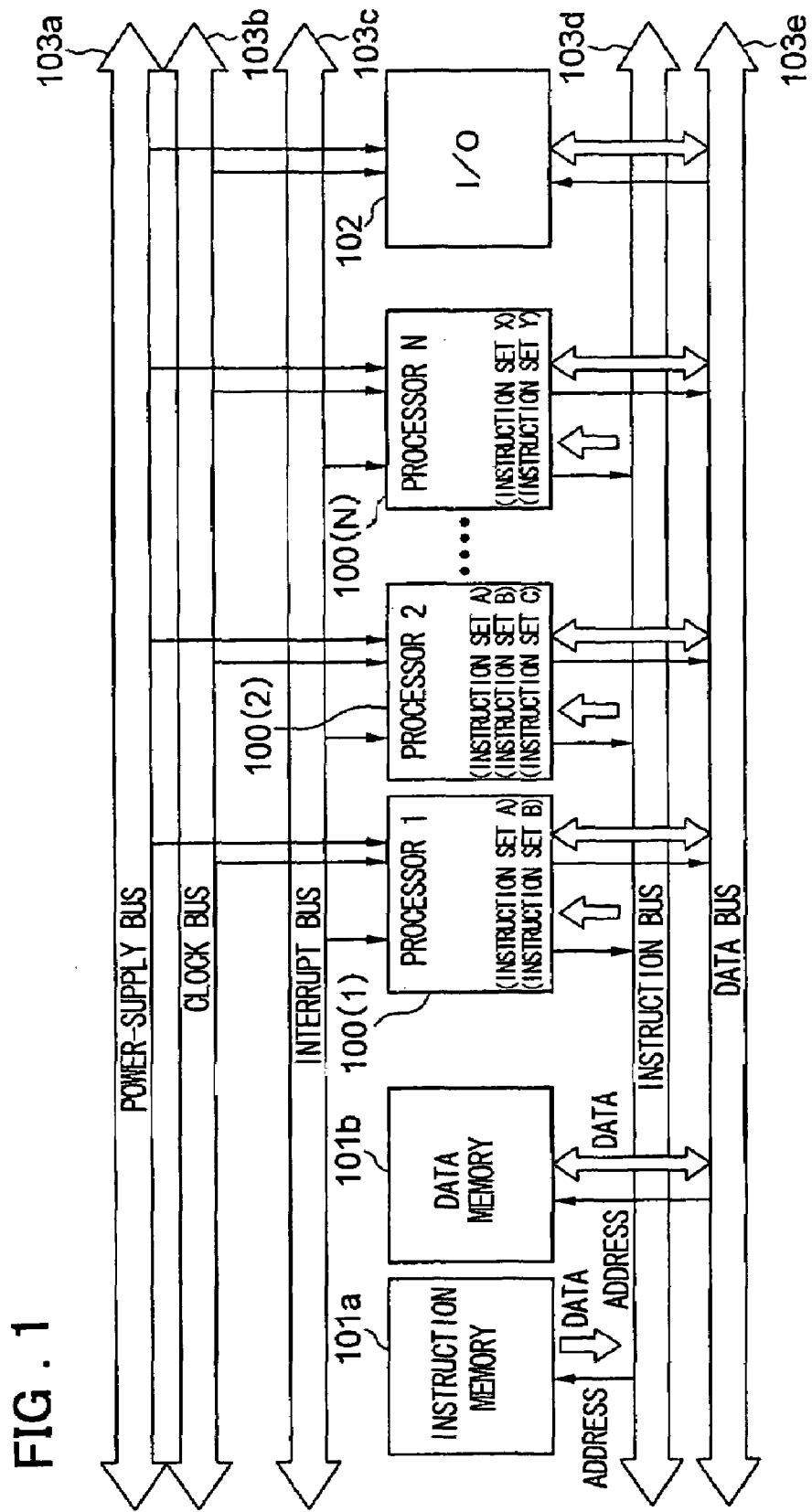
FIG. 1 is a block diagram illustrating an example of the structure of a system LSI circuit according to a first embodiment of the present invention.

FIG. 1 illustrates the structure of a system LSI circuit according to a first embodiment of the present invention. The system LSI circuit includes N-number (where N is a natural number) of processors 100 (1) to 100 (N) and the following components that are shared by each processor 100: an instruction memory 101a, a data memory 101b, an input/output unit 102, a power-supply bus 103a, a clock bus 103b, an interrupt bus 103c, an instruction bus 103d and a data bus 103e. In the description that follows, "100" will be shown as the reference characters of the processors except when a specific processor is to be indicated.

The power-supply bus 103a is connected to a plurality of power supplies, and the clock bus 103b is connected to clock sources of a plurality of different frequencies. The processors 100 and the input/output unit 102 are supplied with power of any voltage value from the power-supply bus 103a, and with clock signals of any frequency from the clock bus 103b. The interrupt bus 103c transmits a plurality of interrupt signals, and the processors 100 are supplied with interrupt signals from the interrupt bus 103c.

The instruction memory 101a stores the application program of each processor 100. The instruction bus 103d includes an instruction address bus and an instruction data bus. Each processor 100 designates an address of the instruction memory 101a via the instruction address bus and accesses the data (instruction) at this address via the instruction data bus. The data memory 101b stores the data used by the processors 100. The data bus 103e includes a data address bus and a data-portion data bus. Each processor 100 designates an address of the data memory 101b via the data address bus and accesses this address via the data-portion data bus.

Each processor 100 has a plurality of instruction sets in any combination. For example, the processor 100 (1) has two instruction sets, namely instruction sets A and B, and the processor 100 (2) has three instruction sets, namely instruction sets A, B and C. Each processor 100 has a plurality of operating modes of different instruction sets used and system clock frequencies or power-supply voltages. The operating mode can be changed over by a specific instruction read from the instruction memory 101a. In addition, the operating mode can be changed over by a specific interrupt signal from the interrupt bus 103c.

Figure 2:
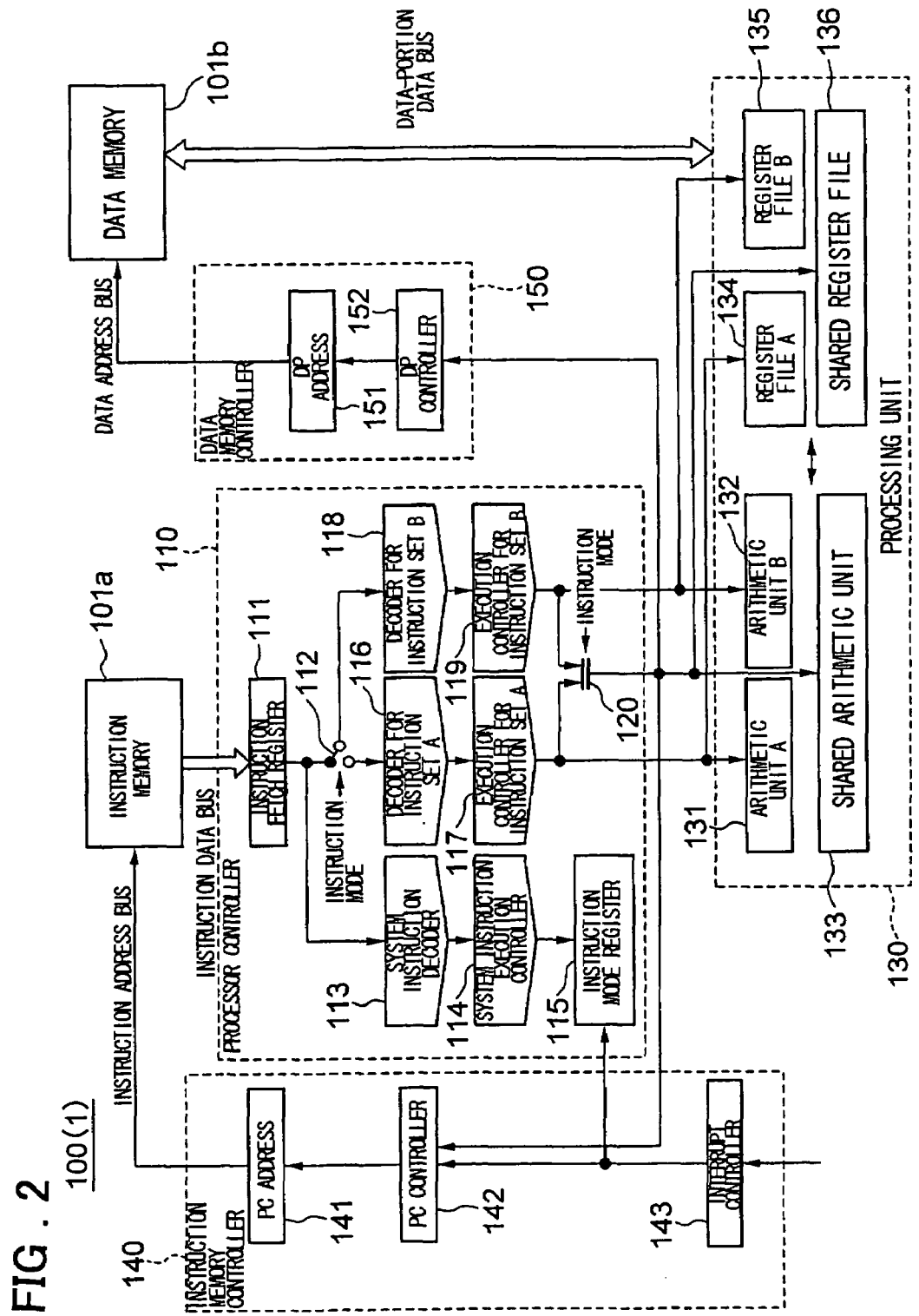
FIG. 2 is a block diagram illustrating a detailed example of the structure of a processor shown in FIG. 1.

FIG. 2 illustrates a detailed example of the structure of processor 100 (1) shown in FIG. 1. As is the case with the processor 100 (1) shown in FIG. 2, each processor has a processor controller 110, a processing unit 130, an instruction memory controller 140 and a data memory controller 150. The components of each processor 100 will be described taking as an example the processor 100 (1) having the instruction set A and the instruction set B.

The processor controller 110 has an instruction fetch register 111, an instruction set changeover unit 112, a system instruction decoder 113, a system instruction execution controller 114, an instruction mode register 115, a decoder 116 for instruction set A, an execution controller 117 for instruction set A, a decoder 118 for instruction set B, an execution controller 119 for instruction set B, and an instruction execution changeover unit 120. The decoder 116 for instruction set A and the execution controller 117 for instruction set A construct a hardware section for implementing the processor functions that execute instruction set A. Similarly, the decoder 118 for instruction set B and the execution controller 119 for instruction set B construct a hardware section for implementing the processor functions that execute instruction set B. The processing unit 130 has an arithmetic unit A 131 and a register file A 134 as hardware resources specific to instruction set A, as well as an arithmetic unit B 132 and a register file B 135 as hardware resources specific to instruction set B. Further, the processing unit 130 has a shared arithmetic unit 133 and a shared register file 136 shared by both instruction sets.

An instruction to be executed by the processor 100 next is read into the instruction fetch register 111 from the instruction memory 101a via the instruction data bus. In addition to programs for the other processors, the instruction memory 101a stores a program that includes the system instruction, the instructions of instruction set A and the instructions of instruction set B of processor 100 (1). The system instruction is constructed as an instruction that specifies the operating mode of the processor 100. The instruction set A and the instruction set B are constructed as instruction sets that are different from each other. For example, the instruction set A is constructed as an instruction set oriented toward control performance and possessed by an ordinary CPU, and the instruction set B is constructed as an instruction set oriented toward signal processing performance and possessed by an ordinary DSP.

The system instruction decoder 113, which is constructed independently of the hardware sections for implementing the processor functions that implement instruction set A and instruction set B, decodes the system instruction received without the intervention of the instruction set changeover unit 112 and transmits the result of decoding to the system instruction execution controller 114. On the basis of the received result of decoding, the system instruction execution controller 114 sets the value of the instruction mode register 115, which holds information for specifying the operating mode of the processor 100 (1). The system instruction includes an instruction that specifies the selection made by the instruction set changeover unit 112 as one instruction that specifies the operating mode, namely an instruction that specifies the instruction set to be used by the processor 100 (i.e., the instruction set used). On the basis of the value in the instruction mode register 115, the instruction set changeover unit 112 changes over the selected state so that the instruction that has been read into the instruction fetch register 111 will be supplied selectively to the decoder 116 for instruction set A or the decoder 118 for instruction set B.

If the instruction set changeover unit 112 has selected the side of the decoder 116 for instruction set A, the instruction that has been read into the instruction fetch register 111 is decoded by the decoder 116 for instruction set A and the result of decoding is transmitted to the execution controller 117 for instruction set A. The latter transmits a control signal directly to the arithmetic unit A 131 and register file A 134. At this time the instruction execution changeover unit 120 selects the execution controller 117 for instruction set A in response to the selection made by the instruction set changeover unit 112, and the execution controller 117 for instruction set A transmits the control signal to a PC controller 142, a DP controller 152, the shared arithmetic unit 133 and the shared register file 136 via the instruction execution changeover unit 120. In other words, the execution controller 117 for instruction set A executes the instructions of instruction set A using both hardware resources specific to instruction set A and hardware resources shared by instructions A and B. The hardware resources not used at this time in executing the instruction set A, namely the decoder 118 for instruction set B, the execution controller 119 for instruction set B, the arithmetic unit B 132 and the register file B 135, are placed in the deactivated state, thereby reducing power-dissipation.

Conversely, if the instruction set changeover unit 112 has selected the side of the decoder 118 for instruction set B, the instruction that has been read into the instruction fetch register 111 is decoded by the decoder 118 for instruction set B and the result of decoding is transmitted to the execution controller 119 for instruction set B. The latter transmits a control signal directly to the arithmetic unit B 134 and register file B 135. At this time the instruction execution changeover unit 120 selects the side of execution controller 119 for instruction set B in response to the selection made by the instruction set changeover unit 112, and the execution controller 119 for instruction set B transmits the control signal to the PC controller 142, the DP controller 152, the shared arithmetic unit 133 and the shared register file 136 via the instruction execution changeover unit 120. In other words, the execution controller 119 for instruction set B executes the instructions of instruction set B using both hardware resources specific to instruction set B and hardware resources shared by instructions A and B. The hardware resources not used at this time in executing the instruction set B, namely the decoder 116 for instruction set A, the execution controller 117 for instruction set A, the arithmetic unit A 131 and the register file A 134, are placed in the deactivated state, thereby reducing power-dissipation.

When an instruction to be decoded is not a system instruction, the system instruction decoder 113 decodes this instruction as a NOP (No OPeration) instruction. Further, when an instruction to be decoded is not an instruction included in instruction set A, the decoder 116 for instruction set A decodes this instruction as a NOP instruction. When an instruction to be decoded is not an instruction included in instruction set B, the decoder 118 for instruction set B decodes this instruction as a NOP instruction.

The instruction memory controller 140 has a program counter (PC) 141, the PC controller 142 and an interrupt controller 143. The address of the instruction memory 101*a* to be read into the instruction fetch register 111 is stored in the program counter 141. The PC controller 142 controls the value in the program counter 141. The interrupt controller 143 receives an externally applied interrupt signal and controls the PC controller 142 and instruction mode register 115.

The PC controller 142 usually increments the program counter 141 so that the instructions in the instruction memory 101*a* are executed successively. If a branch instruction or the like within the instruction memory 101*a* is executed, the PC controller 142 changes the value in program counter 141 to the address that is the destination of the branch based upon a signal from the execution controller 117 for instruction set A or execution controller 119 for instruction set B. Further, based upon an instruction from the interrupt controller 143 that has received a prescribed interrupt signal, the PC controller 142 changes the value in program counter 141 to a prescribed address that has been decided in conformity with the interrupt signal. Upon receiving a specific interrupt signal that requires forcible setting of the instruction set used, the interrupt controller 143 changes the value in the instruction mode register 115, thereby changing the operating mode of the processor 100.

The data memory controller 150 has a data pointer (DP) 151 and a DP controller 152. The data pointer 151 stores an address of the data memory 101*b* at which data is to be sent and received to and from the processing unit 130. The DP controller 152 controls the value in the data pointer 151. If the processor 100 executes a data transfer instruction or the like, then, on the basis of a signal from the execution controller 117 for instruction set A or from the execution controller 119 for instruction set B, the DP controller 152 changes the value of the data pointer 151 to an address that is the destination of data transfer or the source of data transfer. The operation of the processors 100 is similar to that of the processor 100 (1) except for the types of instruction sets and the numbers thereof.

Figure 3:
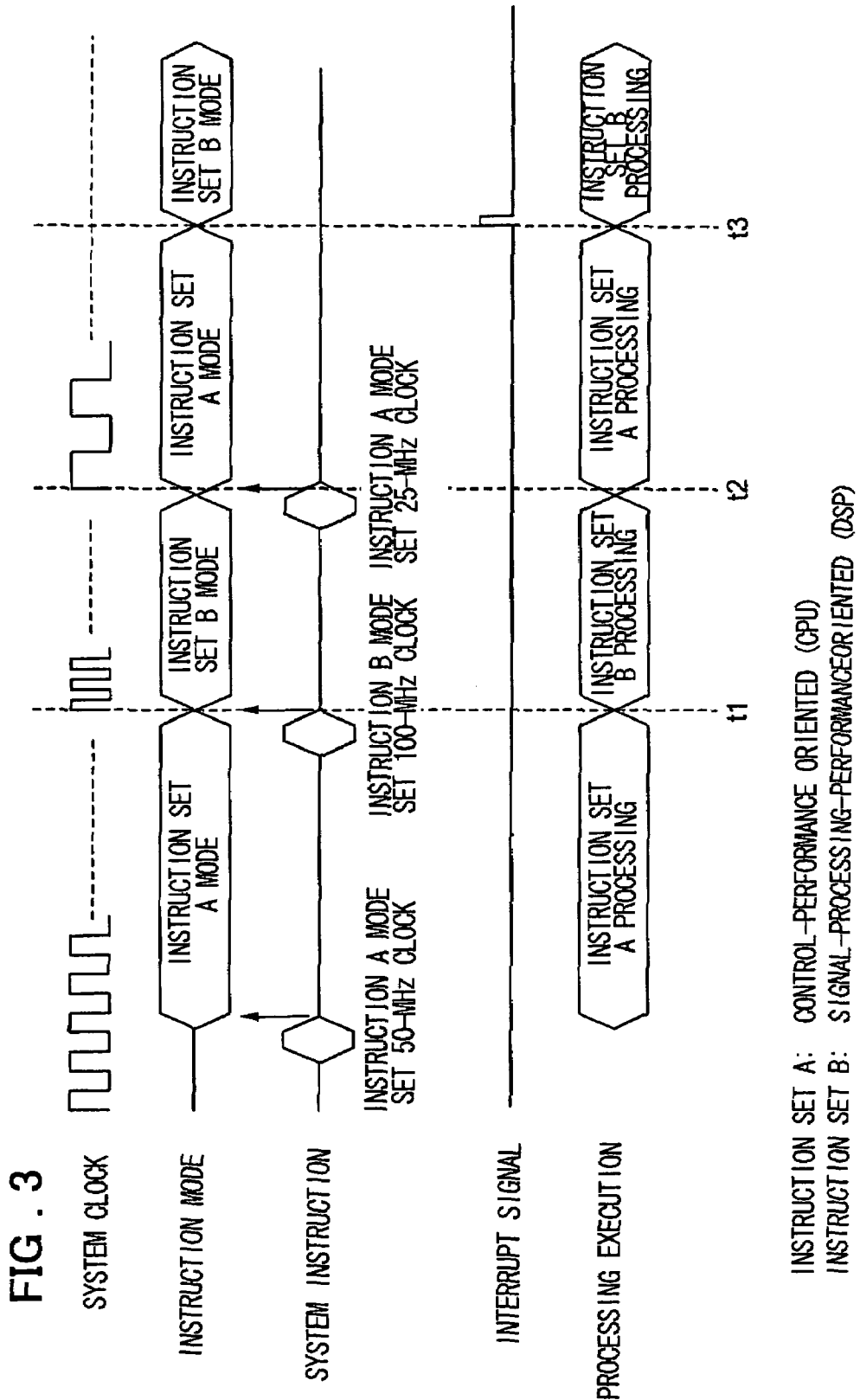
FIG. 3 is a timing chart illustrating an example of the operation of the processor shown in FIG. 2.

FIG. 3 is a timing chart illustrating an example of the operation of the processor 100 (1) shown in FIG. 2. After the program counter 141 is reset to an initial value, the processor 100 (1) reads in from the instruction memory 101*a* and executes a system instruction in which it is specified that the operating mode is one in which the instruction set used is the instruction set A and the clock frequency used is 50 MHz. With the processor 100 (1) set to the mode of instruction set A, the instruction set changeover unit 112 selects the side of the instruction set A and the instruction that has been read out of the instruction memory 101a via the instruction fetch register 111 is decoded by the decoder 116 for instruction set A. Processing is then executed.

If a system instruction, in which it is specified that the operating mode is one where the instruction set used is the instruction set B and the clock frequency used is 100 MHz, is executed at time t1, the instruction set changeover unit 112 selects the side of instruction set B and the processor 100 (1) receives a 100-MHz clock signal from the clock bus 103b as the system clock. At this times power having a value of voltage higher than that which prevailed prior to time t1 is supplied to the processor 100 (1) from the power-supply bus 103a in response to the increase in clock frequency. Owing to the changeover in instruction set used, the processor 100 (1) undergoes a mode change from the processor mode oriented toward control performance to the processor mode oriented toward signal processing performance and, hence, the execution of signal processing by the processor 100 (1) is speeded up.

A system instruction that makes the used instruction set the instruction set A and makes the used clock frequency 25 MHz is executed at time t2 in response to an instruction that has been read out of the instruction memory 101a. The processor 100 (1) operates as a processor oriented toward control performance and the operating clock frequency is slowed down in comparison with that prior to time t1, as a result of which processing is executed at a speed and power-dissipation lower than was the case prior to time t1. If a specific interrupt signal requesting the processor 100 (1) for signal processing enters the interrupt controller 143 at time t3, then the processor 100 (1) again switches the instruction set used to the instruction set B and makes the used clock frequency 100 MHz, thereby executing signal processing at high speed.

Figure 4:
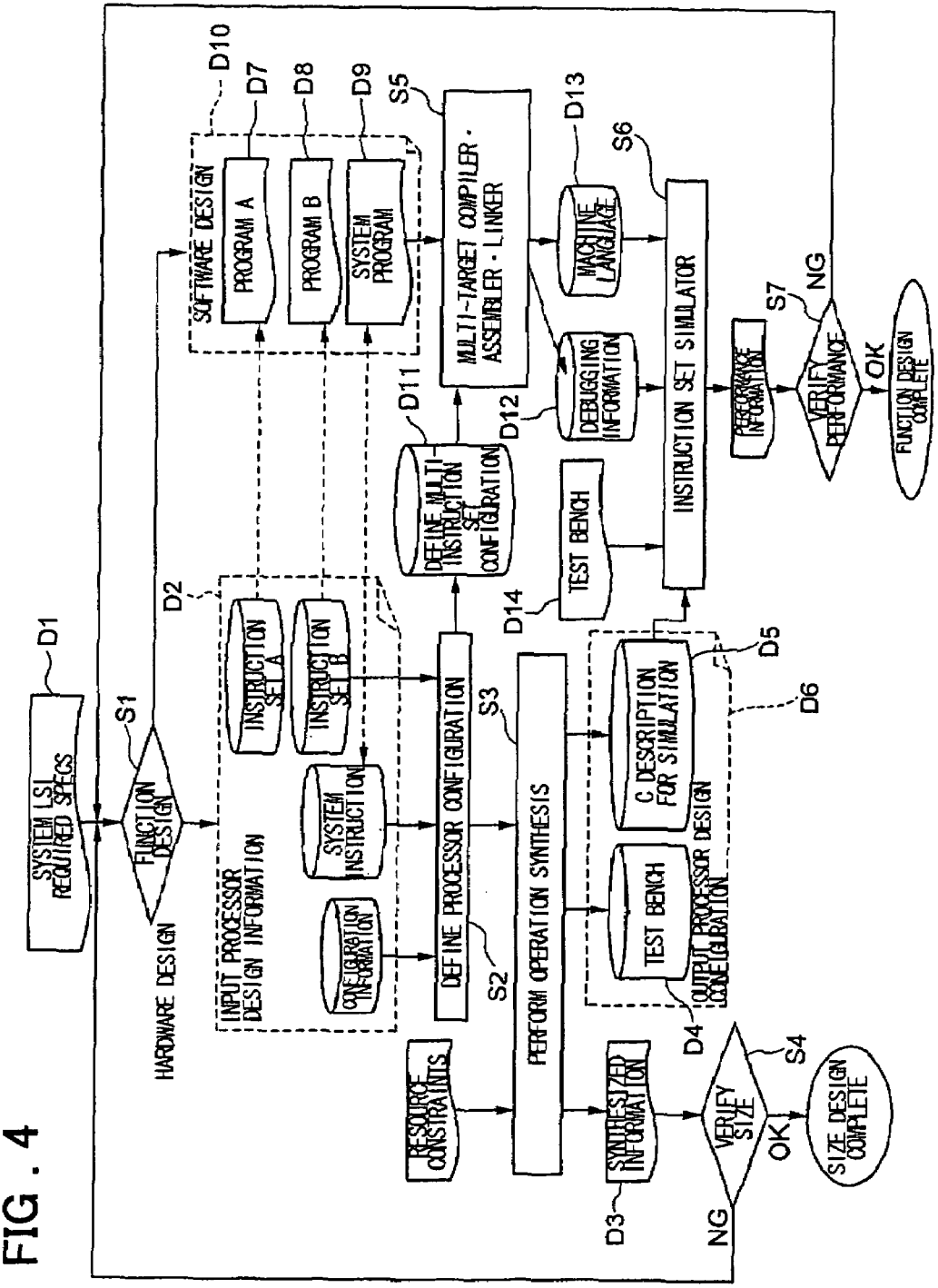
FIG. 4 is a functional block diagram in which a system for implementing a method of designing a system LSI circuit that includes the processor of FIG. 2 is illustrated together with a flowchart of the design method.

FIG. 4 is a functional block diagram in which a CAD system for designing a system LSI circuit that includes the processor of FIG. 2 is illustrated together with a flowchart of the design method. In the designing of a system LSI circuit, all functions of the system LSI circuit to be designed are defined as system LSI requirement specifications D1, and the requirement specifications D1 are divided into a hardware section and a software section taking into account such limiting conditions as the ease with which functional specifications may be modified, the size of the circuitry, processing time and power-dissipation (step S1). In the designing of the hardware section, processor functions are designed using high-level language. In the designing of the software section, an application program that operates in a processor for achieving design as new hardware is designed.

In the designing of the hardware section, processor design information D2 is input and the overall functional configuration of the processors is defined (step S2). The processor design information D2 includes a plurality of instruction sets to be incorporated in processors, a system instruction for changing over processor function (operating mode), and configuration information such as external bus conditions and operating clock frequency. A multi-instruction set configuration definition D11 is obtained from the definition of overall functional configuration of the processors at step S2. The definition D11 is used when an application program that includes instructions of a plurality of instruction sets is translated into machine language correctly in accordance with the instruction sets. The processor design information D2 has resource constraints applied thereto and is subjected to behavioral synthesis together with these constraints (step S3).

As a result of behavioral synthesis at the step S3, synthesis information D3 and a processor design configuration D6 are obtained. The processor design configuration D6 comprises an HDL (Hardware Description Language) description D4, which is for logic synthesis, suitable for achieving conversion to hardware, and a C-language description D5 for simulation purposes, the latter being for verifying operation at the clock-cycle level. The size of the circuitry is checked by the synthesis information D3 obtained (step S4). When the size of the circuitry does not satisfy the constraints on the system LSI circuit, control returns to step S1 so that the circuitry is re-designed from the division into the hardware and software sections. If the result of the circuitry-size check is found to be acceptable at step S4, designing of size is completed and the configuration of the hardware (processors) is decided.

In the designing of the software section, an application program D10 is created in high-level language or the like and the operation of the processors is decided. The application program D10 includes programs to be operated by respective ones of the instruction sets included in the processor design information D2 at the step S2. In the example of FIG. 4, the included programs are a program A (D7) to be operated by instruction set A, a program B (D8) to be operated by instruction set B, and a system program D9 to be operated by the system instruction. The application program D10, along with the multi-instruction set configuration definition D11 obtained from the processor design information D2 at step S2, is assembled by a multi-target assembler, compiled by a compiler and linked by a linker, and there are obtained debugging information D12 and a machine-language instruction D13 that is capable of being directly understood by the processor to be set (step S5).

The C-language description D5 for simulation obtained at the step S3, the debugging information D12 and machine-language instruction D13 obtained at step S5, and a test bench D14, which defines the peripheral environment inclusive of input/output signals for processor testing, are applied to an instruction-set simuLators, and whether processor design includes an error is checked (step S6). The instruction-set simulator debugs the processor configuration and the application program D10, estimates the time performance characteristic and power-dissipation characteristic, which are indicative of the processing performance of the processor, and outputs the time performance characteristic and power-dissipation characteristic as performance information D15.

Whether the system LSI circuit meets the sought performance requirements are checked (step S7) based upon the performance information D15 obtained at the step S6. If the sought performance requirements are not satisfied, control returns to the step S1 so that the system LSI circuit is re-designed from the division into the hardware and software sections. If the performance of the system LSI circuit meets the sought performance requirements, designing of the system LSI circuit is completed and the processors and application programs that are run by these processors are finalized.

According to the present embodiment, the system instruction decoder 113, which is independent of the decoders of the instruction sets, decodes the system instruction that specifies the operating mode of the processor inclusive of selection of the instruction set used. As a result, the decoder of each instruction set need not be furnished with circuit resources for decoding instructions that require instruction sets to be changed over. This means that there is no increase in the size of the circuitry of processor 100. By constructing the system instruction as an instruction that is independent of each of the instruction sets, the processor 100 can change over the instruction set used without having to recognize the instruction set that prevailed prior to the changeover. In addition, the processor 100 can change over the instruction set used not only in response to a system instruction read in from the instruction memory 101a but also in response to a specific externally applied interrupt signal that requests forcible setting of the instruction set to be used.

In the designing of a system LSI circuit that includes processors according to the present embodiment, a processor having a plurality of instruction sets is obtained by performing behavioral synthesis based upon an operation description having a degree of abstraction higher than that of the RT (register transfer) level. As a result, it is possible to obtain a system LSI circuit (processor) in which hardware resources such as arithmetic resources having a high degree of versatility are shared among different instruction sets, and a system LSI circuit having a high processing capability can be obtained more efficiently in hardware circuitry of limited size. Further, the operation of the system LSI circuit can be verified easily by verifying the operation of the C-language description D5, which has been obtained by behavioral synthesis, together with the application program at the clock-cycle level using an instruction set simulator.

In the present embodiment, an example in which the processor 100 has a plurality of different instruction sets is described. However, it is permissible to adopt an arrangement in which the plurality of instruction sets included in the processor 100 are themselves identical but are made instruction sets in which the modes of use of hardware resources differ. In FIG. 2, for example, the instruction set A and the instruction set B can be constructed by identical instruction sets that afford identical execution results by identical instruction codes, the instruction set A can be so adapted that the instructions are executed using hardware resources (e.g., circuitry of large size) specific to instruction set A, and the instruction set B can be so adapted that the instructions are executed using hardware resources (e.g., circuitry of small size) specific to instruction set B. In this case, the instruction memory 101a would store an application program composed of a single instruction set.

By way of example, in the case of a processor having a low power-dissipation mode, the power-dissipation is reduced by slowing down the operating clock frequency. In general, hardware resources that support high-speed operation are such that the size of the circuitry is greater than in the case of hardware resources for low-speed operation. When a processor that supports high-speed operation is being operated in the low power-dissipation mode, hardware resources become redundant. In order to avoid this, a high-speed instruction set and a low-speed instruction set are incorporated in a processor as identical instruction sets and the processor is so constructed that instructions are executed using the hardware resources for high-speed operation when the high-speed instruction set is selected and using the hardware resources for low-speed operation when the low-speed instruction set is selected. When this processor operates in the low power-dissipation mode and the low-speed instruction set is selected, the supply of power to the hardware resources for the high-speed instruction set is cut off, thereby reducing the power that is supplied to the redundant hardware and making a further reduction in power-dissipation possible.

Figure 5C:
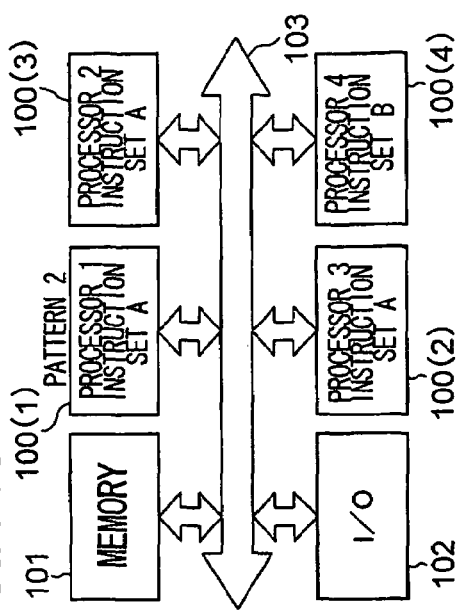
FIGS. 5a, 5b and 5c are block diagrams illustrating examples of the structure of a system LSI circuit having four processors.
Figure 5A:
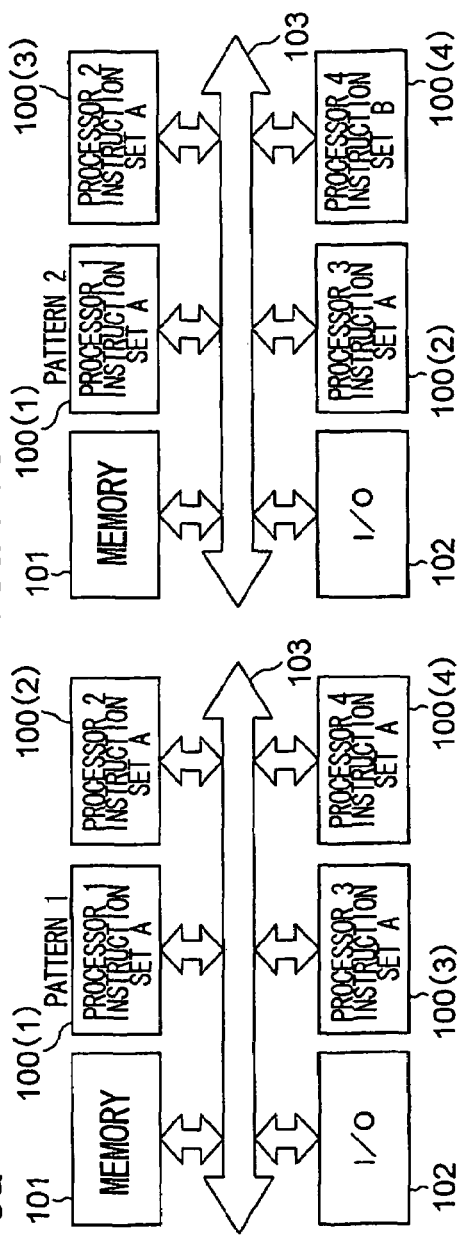
Figure 5B:
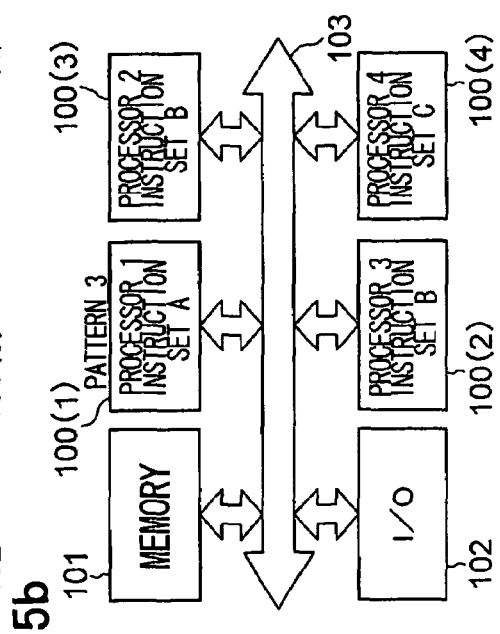

FIGS. 5a, 5b and 5c illustrate examples of system LSI circuit configurations each having four processors 100. The system LSI circuit has the four processors 100, a memory 101 that includes an instruction memory and a data memory, the input/output unit 102 and various buses 103. The system LSI circuit has three operating patterns, namely a pattern 1 [in FIG. 5a] in which all four processors 100 (1) to 100 (4) operate according to instruction set A, a pattern 2 [in FIG. 5b] in which the first to third processors 100 (1) to 100 (3) operate according to instruction set A and the fourth processor 100 (4) according to instruction set B, and a pattern 3 [in FIG. 5c] in which the first processor 100 (1) operates according to instruction set A, the second and third processors 100 (2), 100 (3) according to instruction set B and the fourth processor 100 (4) according to instruction set C.

In order to achieve the three operating patterns described above, it is required at minimum that the first processor 100 (1) have instruction set A, that the second and third processors 100 (2), 100 (3) have instruction sets A and B, and that the fourth processor 100 (4) have instruction sets A, B and C. For example, instruction set A is composed of an instruction set oriented toward control performance, namely an instruction set suited to protocol software or the like written in C language, the instruction set B is composed of an instruction set oriented toward ordinary signal processing performance, namely an instruction set suited to an ordinary AV-type media application or the like, and the instruction set C is composed of an instruction set oriented toward special-purpose signal processing performance, namely an instruction set suited to signal processing of a communication data path, etc.

FIG. 6 illustrates the processing performance of the system LSI circuit of FIGS. 5a, 5b and 5c in the form of vectors. In a case where the system LSI circuit operates according to pattern 1 [in FIG. 5a], all of the processors operate according to instruction set A and therefore the system LSI circuit operates as one having a high control performance and a low signal processing performance, as indicated by vector a. In a case where the system LSI circuit operates according to pattern 2 [in FIG. 5b], one of the four processors operates according to instruction set B and therefore the system LSI circuit operates as one having a low control performance and a high signal processing performance, as indicated by vector b. In a case where the system LSI circuit operates according to pattern 3 [in FIG. 5c], the system LSI circuit operates as one having a lower control performance and a higher signal processing performance in comparison with pattern 2, as indicated by vector c.

Figure 7:
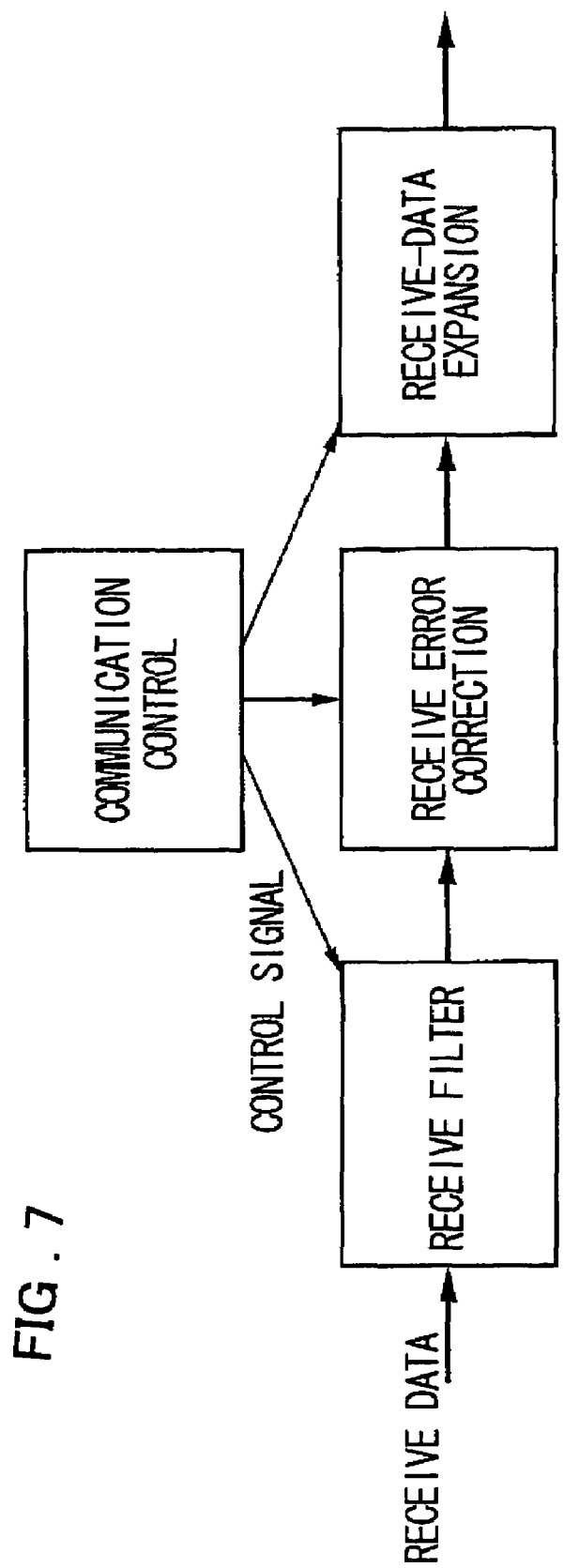
FIG. 7 is a functional block diagram illustrating the content of processing by the system LSI circuit of FIGS. 5a, 5b and 5c.
Figure 8:
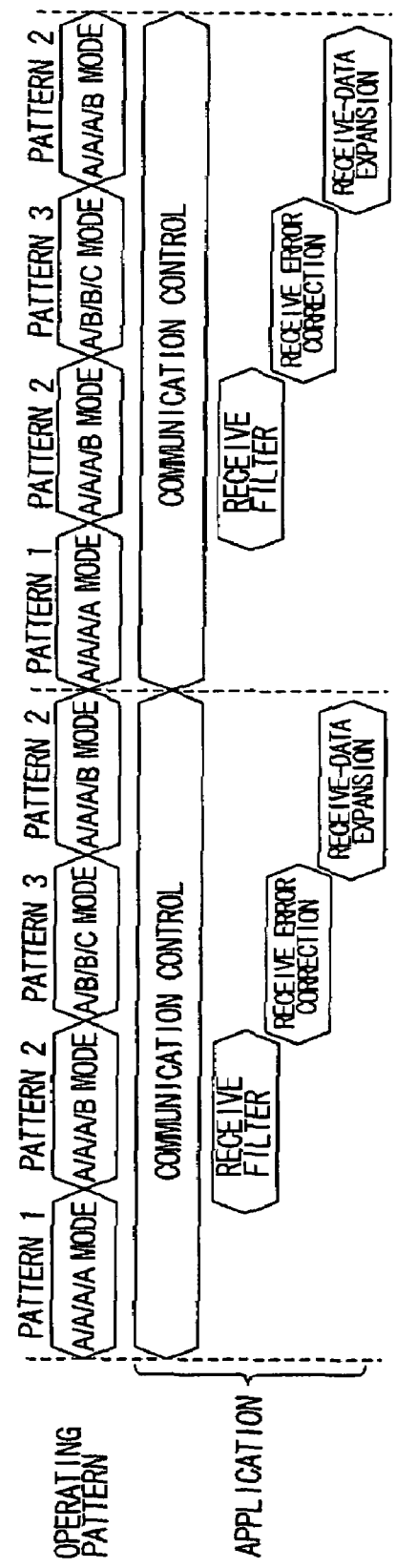
FIG. 8 is a timing chart illustrating an example of operation of the system LSI circuit of FIGS. 5a, 5b and 5c.

FIG. 7 illustrates an example of processing by the system LSI circuit of FIGS. 5a, 5b and 5c in the form of a block diagram, and FIG. 8 illustrates the corresponding relationship between the processing by the system LSI circuit and the operating patterns. As shown in FIG. 7, the system LSI circuit has successively, as an application, receive filter processing for filtering received data, receive error correction processing for subjecting the filtered data to error correction, and receive-data expansion processing for expanding the error-corrected data, as well as communication control processing executed in parallel with control according to this processing.

In an interval in which the system LSI circuit executes only communication control processing in FIG. 8, the communication control processing is required to have processing capability oriented toward control performance. The system LSI circuit therefore adopts the instruction set A as the instruction set of all processors and operates according to pattern 1 shown in FIG. 5a. In an interval in which the receive filter processing and receive-data expansion processing is executed, this processing is required to have processing capability oriented toward ordinary signal processing performance. The system LSI circuit therefore changes over the instruction set of one processor of the four processors to instruction set B and operates according to pattern 2 shown in FIG. 5b. In an interval in which the receive error correction processing is executed, the receive error correction processing is required to have processing capability oriented toward ordinary signal processing performance and processing capability oriented toward special-purpose signal processing performance. The system LSI circuit therefore adopts the instruction set B as the instruction set of two of the four processors, adopts the instruction set A as the instruction set of one of the remaining processors, adopts the instruction set C as the instruction set of the other of the remaining processors and operates according to pattern 3 shown in FIG. 5c.

Thus, the system LSI circuit is such that in response to a system instruction of an application program or a specific interrupt signal, the instruction sets used by a plurality of processors can be made the same instruction sets for all processors 100 or the instruction sets used by a prescribed number of processors 100 can be made instruction sets that differ from those of the other processors 100, as shown in FIG. 8. By thus changing the used instruction sets dynamically, the processing performance orientation of the system LSI circuit can be set at will along the time axis in accordance with the processing performance orientation that is required for the processing to be executed by the system LSI circuit, which processing changes from moment to moment. This makes it possible to improve the processing capability of each process executed by the system LSI circuit.

Figure 9:
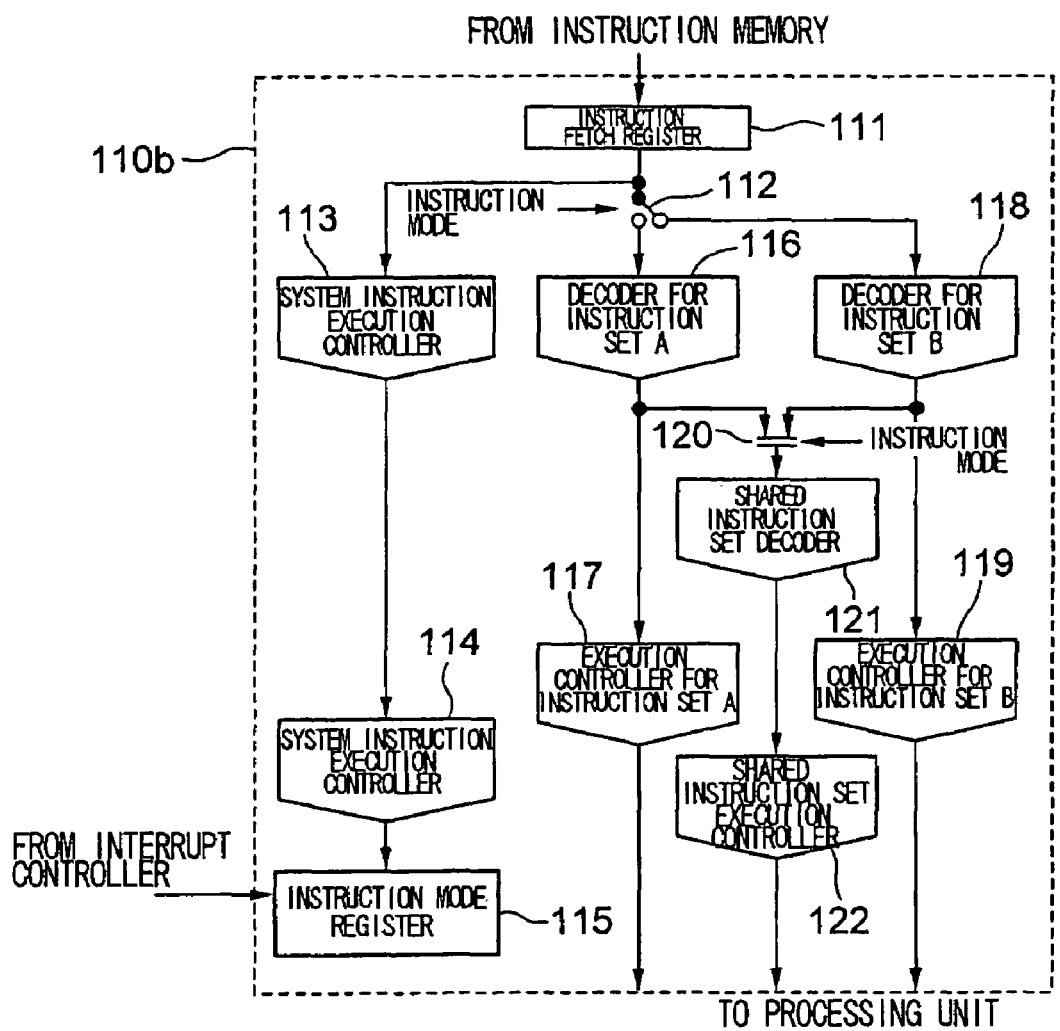
FIG. 9 is a block diagram illustrating an example of the structure of a processor controller for controlling a processor according to a second embodiment of the present invention.

FIG. 9 is a diagram illustrating the configuration of a processor controller for controlling a processor according to a second embodiment of the present invention. This embodiment differs from the first embodiment in that the processor controller 110 of FIG. 2 is replaced by a processor controller 110b. The latter includes the instruction fetch register 111, instruction set changeover unit 112, system instruction decoder 113, system instruction execution controller 114, instruction mode register 115, decoder 116 for instruction set A, execution controller 117 for instruction set A, decoder 118 for instruction set B, execution controller 119 for instruction set B, instruction execution changeover unit 120, a shared instruction set decoder 121 and a shared instruction set execution controller 122.

The shared instruction set decoder 121 receives a shared instruction, which is common to instruction set A and instruction set B and is read in by the instruction fetch register 111, via the decoder 116 for instruction set A or decoder 118 for instruction set B and the instruction execution changeover unit 120. The shared instruction set decoder 121 decodes the instruction and outputs the result of decoding. On the basis of the decoded signal from the shared instruction set decoder 121, the shared instruction set execution controller 122 transmits a control signal to the processing unit 130, PC controller 142 and DP controller 152 and executes the shared instruction.

According to this embodiment, one or more instructions shared by a plurality of instruction sets are decoded by the shared instruction set decoder 121 and executed. In the first embodiment, the decoder 116 for instruction set A and the execution controller 117 for instruction set A, which are hardware resources, each require circuit resources for outputting decoded results corresponding to a shared instruction. With the second embodiment, however, redundant parts of the circuit resources for decoder 116 for instruction set A and execution controller 117 for instruction set A can be reduced. By way of example, the four arithmetical operations common to the processors are included as shared instructions.

Figure 10:
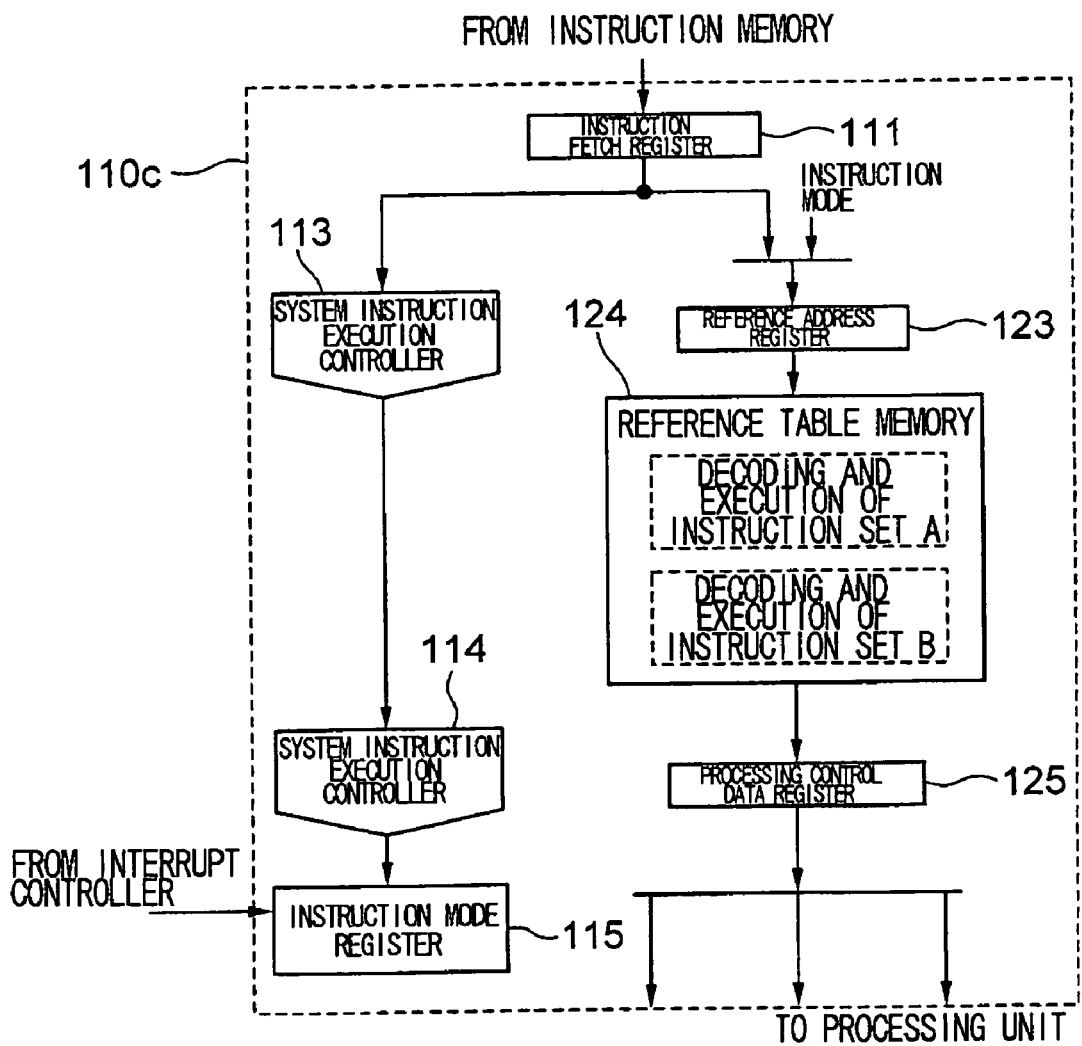
FIG. 10 is a block diagram illustrating an example of the structure of a processor controller for controlling a processor according to a third embodiment of the present invention.

FIG. 10 is a diagram illustrating the configuration of a processor controller for controlling a processor according to a third embodiment of the present invention. This embodiment differs from the first embodiment in that the processor controller 110 of FIG. 2 is replaced by a processor controller 110c. The latter includes the instruction fetch register 111, instruction set changeover unit 112, system instruction decoder 113, system instruction execution controller 114, instruction mode register 115, a reference address register 123, a reference table memory 124 and a processing control data register 125.

Decoded data corresponding to output signals from the decoder 116 for instruction set A and decoder 118 for instruction set B (FIG. 2) and execution control data corresponding to output signals from the execution controller 117 for instruction set A and execution controller 119 for instruction set B (FIG. 2) are stored in the reference table memory 124 as horizontal microcode (a horizontal instruction). In regard to the reference table memory 124, the addresses of the decoded data and execution control data are set in such a manner that decoded data and execution control data corresponding to an instruction to be executed in a selected instruction set will be extracted by a reference address that is based upon the instruction to be executed and information of the instruction set that has been selected.

When an instruction (instruction code) is read into the instruction fetch register 111 from the instruction memory 101a, a reference address that is decided based upon the instruction code and information of the instruction set selected by the instruction mode register 115 is supplied to the reference address register 123. The reference table memory 124 conducts a table search using the reference address as a key, extracts decoded data and execution control data and inputs the extracted results to the processing control data register 125. The processing unit 130 (FIG. 1) executes an instruction, which has been applied to the processor 100 (1), based upon horizontal microcode held by the processing control data register 125.

In this embodiment, rather than providing a decoder and execution controller as circuit resources for every instruction set, information for decoding or executing an instruction that has been read into the instruction fetch register 111 is stored in the reference table memory 124, which is a memory resource. The decoded data and execution control data in the reference table memory 124 can be modified programmably. Even after the hardware configuration of the system LSI circuit has been decided, therefore, the decoded data and execution control data can be changed dynamically during execution of an application program. For example, even in a case where the memory capacity of the reference table memory 124, which is a hardware resource within the system LSI circuit, is fixed, the number of instructions contained in an instruction set can be increased or the number of instruction sets can be increased by externally rewriting the decoded data and execution control data in reference table memory 124.

Figure 11:
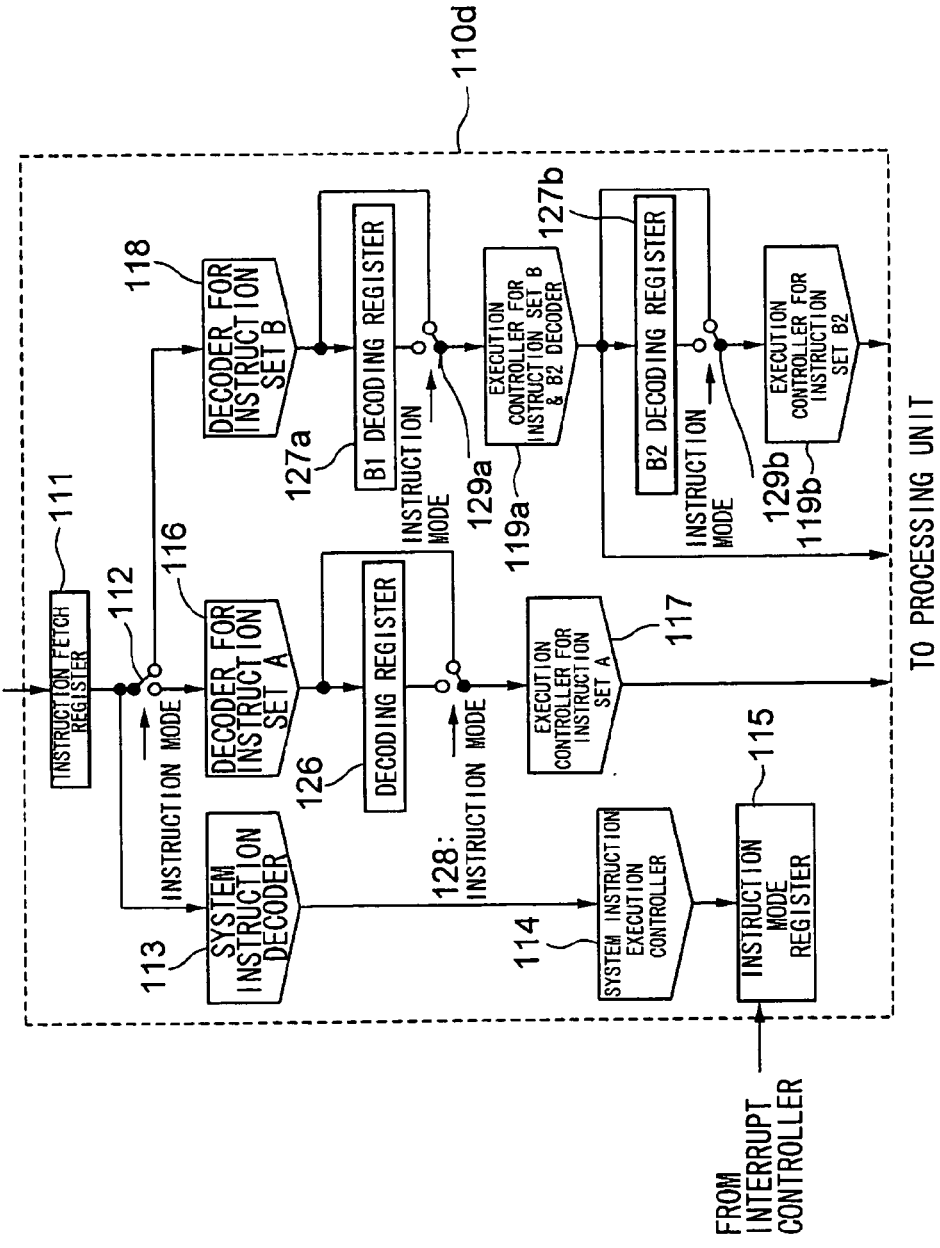
FIG. 11 is a block diagram illustrating an example of the structure of a processor controller for controlling a processor according to a fourth embodiment of the present invention.
Figure 12:
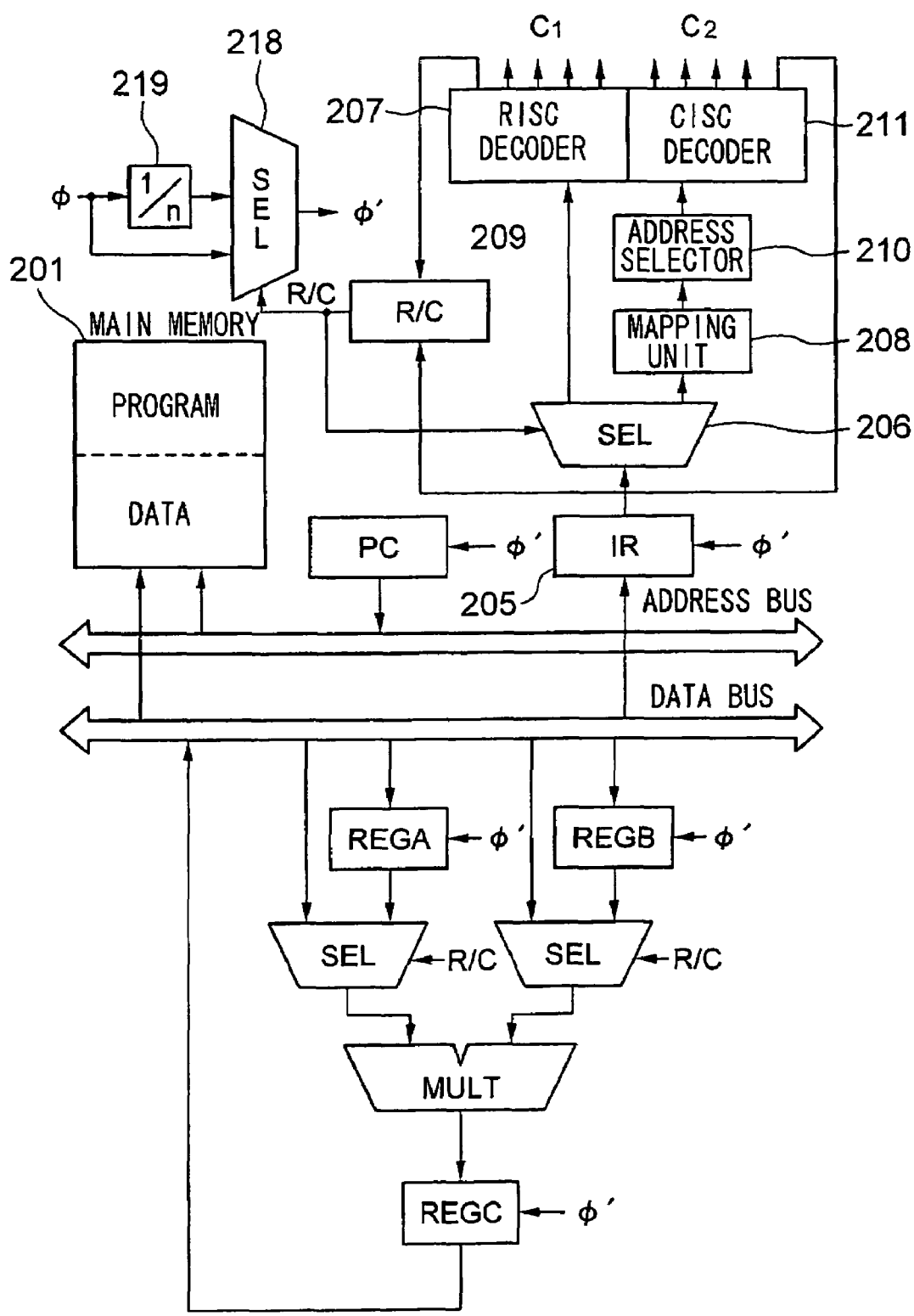
FIG. 12 is a block diagram illustrating the structure of a processor according to the prior art.

FIG. 11 is a diagram illustrating the structure of a processor controller for controlling a processor according to a fourth embodiment of the present invention. According to this embodiment, the processor controller 110 of FIG. 2 is replaced by a processor controller 110d, and the processor 100 (1) is capable of switching between an instruction set and number of pipeline stages of every instruction set. The processor controller 110d has the instruction fetch register 111, instruction set changeover unit 112, system instruction decoder 113, system instruction execution controller 114, instruction mode register 115, decoder 116 for instruction set A, an A decoding register 126, a stage-number changeover unit 128 for instruction set A, the execution controller 117 for instruction set A, decoder 118 for instruction set B, a B1 decoding register 127a, an execution controller 119a for instruction set B1, a B2 decoding register 127b, stage-number changeover units 129a, 129b for instruction set B, and an execution controller 119b for instruction set B2.

System instructions include an instruction that specifies selection made by the instruction set changeover unit 112, namely an instruction that specifies the instruction set to be used, and an instruction that specifies the selected state of the stage-number changeover unit 128 for instruction set A and of the first and second stage-number changeover units 129a, 129b for the instruction set B, namely an instruction that specifies the number of pipeline stages for every instruction set. The instruction mode register 115 holds information that specifies the selection made by the instruction set changeover unit 112 and information that specifies the selections made by the stage-number changeover unit 128 for instruction set A and by the first and second stage-number changeover units 129a, 129b for the instruction set B.

The stage-number changeover unit 128 for instruction set A supplies the result of decoding by the decoder 116 for instruction set A to the execution controller 117 for instruction set A via the A decoding register 126 or directly. When the stage-number changeover unit 128 for instruction set A supplies the result of decoding to the execution controller 117 for instruction set A via the A decoding register 126, the instruction set A undergoes a pipeline operation in three stages, namely an instruction fetch stage, a decode stage and an execution stage. When the stage-number changeover unit 128 for instruction set A supplies the result of decoding to the execution controller 117 for instruction set A directly, the instruction set A undergoes a pipeline operation in two stages, namely an instruction fetch stage and a decode-and-execute stage.

The first stage-number changeover unit 129a for instruction set B supplies the result of decoding by the decoder 118 for instruction set B to the execution controller 119a for instruction set B1 directly or via the B decoding register 127. The execution controller 119a for instruction set B1 performs instruction execution based upon the supplied result of decoding and performs instruction decoding in the latter half of a two-cycle instruction. The second stage-number changeover unit 129b for instruction set B supplies the execution controller 119b for instruction set B2 with the result of instruction decoding of the latter half in execution controller 119a for instruction set B directly or via the B2 decoding register 127b.

When the first stage-number changeover unit 129a for instruction set B supplies the execution controller 119a for instruction set B1 with decoded results via the B1 decoding register 127a and the second stage-number changeover unit 129b for instruction set B supplies the execution controller 119b for instruction set B2 with decoded results via the B2 decoding register 127b, the number of pipeline stages becomes the maximum of four. When the first and second stage-number changeover units 129a, 129b for instruction set B both supply the execution controller 119a for instruction set B1 or execution controller 119b for instruction set B2 with the decoded results, the number of pipeline stages becomes the minimum of two.

According to this embodiment, the number of pipeline stages for every instruction set can be used upon being changed over dynamically based upon the system instruction, this being in addition to the changeover of instruction set used. This means that the processing speed of the processor 100 can be set at will by the application program in accordance with the processing capability required for system LSI processing. Thus, by changing the number of pipeline stages, processing can be executed using the pipeline at the time of high-speed processing, and processing can be executed upon reducing the number of pipeline stages at the time of low-speed processing (at the time of low power-dissipation), thereby making it possible to set the processor environment appropriately in conformity with the mode of processing.

The foregoing embodiments have been described with regard to an example in which the instruction set A and the instruction set B are composed of instruction sets having different processing performance orientations. However, a plurality of instruction sets included in a processor may contain instruction sets having the same type of processing performance orientation. Further, the setting of an instruction set to be used, the setting of operating clock frequency, the setting of power-supply voltage and the setting of number of pipeline stages have been cited as examples of system instructions for setting the processor operating mode. However, system instructions may also include any of setting of a standby mode, setting of power on/off, setting of a plug-in for an active arithmetic unit, setting of a plug-in for an active register, setting of interrupt conditions and setting of bug mode.

The present invention has been described based upon preferred embodiments thereof. However, the processor of the present invention, the system LSI circuit, the method of designing the system LSI circuit and a recording medium on which the method has been recorded are not limited to the above embodiments, and a processor, system LSI circuit, method of designing the system LSI circuit and recording medium on which the method has been recorded, which have been changed or modified in various ways from the embodiments described above, also fall within the scope of the present invention.

The meritorious effects of the present invention are summarized as follows.

Thus, as described above, the processor of the present invention and the system LSI circuit having this processor operate according to a processor function that corresponds to an instruction set selected from among a plurality of instruction sets by a system instruction that does not belong to any of the instruction sets. When an instruction set is changed over, therefore, it is unnecessary for the processor to recognize the instruction set that prevailed prior to the changeover and, hence, the changeover can be made with ease. Further, it can be so arranged that an instruction set is changed over in response to a prescribed interrupt signal besides an entered instruction.

The method of designing a system LSI circuit according to the present invention and the recording medium on which this method has been recorded are such that by obtaining the circuit configuration of a processor having a plurality of instruction sets by behavioral synthesis, hardware resources can be shared with ease and a system LSI circuit having a high processing performance can be designed easily in a circuit of limited size.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A processor that performs a first instruction set and a second instruction set, comprising:

a first execution controller executing a first decoded result being a decoded signal of an instruction included in the first instruction set;

a second execution controller executing a second decoded result being a decoded signal of an instruction included in the second instruction set, the second execution controller being set up independently from the first execution controller;

a first arithmetic unit performing an arithmetical operation relative to execution of only the first decoded result; and a shared arithmetic unit operatively coupled in common to the first and second execution controllers to perform arithmetical operations relative to execution of the first decoded result and the second decoded result, wherein the first execution controller executes the first decoded result by using both the first arithmetic unit and the shared arithmetic unit.

2. The processor according to claim 1, further comprising:
a first decoder that generates the first decoded result by decoding the instruction included in the first instruction set; and a second decoder that generates the second decoded result by decoding the instruction included in the second instruction set.

3. The processor according to claim 1, further comprising:
a common instruction set decoder that decodes a common instruction included commonly in the first and second instruction sets.

4. The processor according to claim 2, further comprising:
a pipeline stage that is provided between the first decoder and a first processing unit.

5. The processor according to claim 2, further comprising:
a first pipeline stage provided between the first decoder and a first processing unit; and a second pipeline stage provided between the second decoder and a second processing unit.

6. The processor according to claim 5, wherein said first pipeline stage has a different number of stages than said second pipeline stage.

7. The processor according to claim 4, wherein a number of stages of the first pipeline stage is variable.

8. The processor according to claim 5, wherein a number of the first and second pipeline stages are variable.

9. The processor according to claim 2, further comprising a system instruction decoder that decodes a system instruction and selects use of one of the first and second decoders based on the system instruction.

10. The processor according to claim 9, wherein said system instruction decoder is provided separate from the first and second decoders.

11. The processor according to claim 2, wherein any one of the first and second decoders is selected for use in response to an interrupt signal.

12. The processor according to claim 9, wherein said system instruction includes at least one of instructions for setting power voltage and/or operating rate at which the processor operates.

13. The processor according to claim 1, further comprising:
a memory that stores both the first and second decoded results.

14. The processor according to claim 1, further comprising:
a first register file operating with regard to execution of only the first decoded result; and a shared register file operating with regard to execution of the first decoded result or the second decoded result.

15. The processor according to claim 14, further comprising:
a second arithmetic unit performing an arithmetical operation relative to execution of only the second decoded result; and a second register file operating with regard to execution of only the second decoded result.

16. A processor comprising:
a first decoder decoding a first instruction to output a first decoded result without decoding a second instruction;

a second decoder decoding the second instruction to output a second decoded result without decoding the first instruction;

a first execution controller coupled to the first decoder to transmit a first control signal in response to the first decoded result from the first decoder;

a second execution controller coupled to the second decoder to transmit a second control signal in response to the second decoded result from the second decoder;

a first arithmetic unit coupled to the first execution controller to operate with regard to execution of the first decoded result in response to the first control signal, said first arithmetic unit being not responsive to the second control signal from the second execution controller;

a shared arithmetic unit operatively coupled to the first and second execution controllers to operate with regard to execution of the first and second decoded results in response to one of the first and second control signals, wherein the first execution controller executes the first decoded result by using both the first arithmetic unit and the shared arithmetic unit.

17. The processor according to claim 16, further comprising:
a second arithmetic unit coupled to the second execution controller to operate with regard to an execution of the second decoded result in response to the second control signal without responding to the first control signal from the first execution controller.

18. The processor according to claim 16, wherein
the first arithmetic unit and the shared arithmetic unit receive the first control signal from the first execution controller at the same time.

* * * * *